US008021531B2

(12) United States Patent
Park et al.

(10) Patent No.: US 8,021,531 B2
(45) Date of Patent: Sep. 20, 2011

(54) METHOD FOR MODIFYING THE CONCENTRATION OF REACTANTS IN A MICROFLUIDIC DEVICE

(75) Inventors: Charles Park, Mountain View, CA (US); Irina Kazakova, Los Gatos, CA (US)

(73) Assignee: Caliper Life Sciences, Inc., Mountain View, CA (US)

(*) Notice: Subject to any disclaimer, the term of this patent is extended or adjusted under 35 U.S.C. 154(b) by 998 days.

(21) Appl. No.: 11/787,422

(22) Filed: Apr. 16, 2007

(65) Prior Publication Data

US 2008/0000774 A1 Jan. 3, 2008

Related U.S. Application Data

(60) Provisional application No. 60/792,037, filed on Apr. 14, 2006.

(51) Int. Cl.
*G01N 27/447* (2006.01)
*G01N 27/26* (2006.01)

(52) U.S. Cl. ........ 204/549; 204/451; 204/601; 204/645; 204/644; 204/548; 204/617; 435/6

(58) Field of Classification Search .................. 204/549, 204/645, 600–614, 548, 451, 644, 617; 435/6
See application file for complete search history.

(56) References Cited

U.S. PATENT DOCUMENTS 6,440,722 B1 * 8/2002 Knapp et al. .................... 702/20
6,733,645 B1 * 5/2004 Chow ............................ 204/453

FOREIGN PATENT DOCUMENTS

WO WO 2005/024411 * 3/2005

OTHER PUBLICATIONS

Molho et al. (Anal. Chem. 2001, 73, 1350-1360).*
Matta et al. (Journal of Microelectrochemical Systems, vol. 13, No. 2, Apr. 2004, pp. 310-322).*

* cited by examiner

*Primary Examiner* — Jeffrey T Barton
*Assistant Examiner* — Jennifer Dieterle
(74) *Attorney, Agent, or Firm* — Cardinal Law Group

(57) ABSTRACT

A method of carrying out a chemical reaction on a microfluidic device in which a first reactant at a first concentration is delivered into a reaction channel; within the reaction channel the concentration of the first reactant is changed from the first concentration to a second concentration; and while at the second concentration the first reactant is exposed to a second reactant.

16 Claims, 8 Drawing Sheets

METHOD FOR MODIFYING THE CONCENTRATION OF REACTANTS IN A MICROFLUIDIC DEVICE

CROSS-REFERENCES TO RELATED APPLICATIONS

This application claims the benefit of priority from U.S. Provisional Patent Application Ser. No. 60/792,037, filed Apr. 14, 2006, the entire contents of which is incorporated herein by reference.

FIELD OF THE INVENTION

The present invention relates to the performance of chemical analyses within a microfluidic device. More particularly, embodiments of the present invention are directed toward precisely controlling the concentration of reactants within a microfluidic device.

BACKGROUND OF THE INVENTION

Microfluidics refers to a set of technologies involving the flow of fluids through channels having at least one linear interior dimension, such as depth or radius, of less than 1 mm. It is possible to create microscopic equivalents of bench-top laboratory equipment such as beakers, pipettes, incubators, electrophoresis chambers, and analytical instruments within the channels of a microfluidic device. Since it is also possible to combine the functions of several pieces of equipment on a single microfluidic device, a single microfluidic device can perform a complete analysis that would ordinarily require the use of several pieces of laboratory equipment. A microfluidic device designed to carry out a complete chemical or biochemical analyses is commonly referred to as a micro-Total Analysis System (μ-TAS) or a "lab-on-a chip."

A lab-on-a-chip type microfluidic device, which can simply be referred to as a "chip," is typically used as a replaceable component, like a cartridge or cassette, within an instrument. The chip and the instrument form a complete microfluidic system. The instrument can be designed to interface with microfluidic devices designed to perform different assays, giving the system broad functionality. For example, the commercially available Agilent 2100 Bioanalyzer system can be configured to perform four different types of assays—namely DNA (deoxyribonucleic acid), RNA (ribonucleic acid), protein and cell assays—by simply placing the appropriate type of chip into the instrument.

Microfluidic devices designed to carry out complex analyses will often have complicated networks of intersecting channels. Performing the desired assay on such chips will often involve separately controlling the flows through certain channels, and selectively directing flows from certain channels through channel intersections. Fluid flow through complex interconnected channel networks can be accurately controlled by applying a combination of external driving forces to the microfluidic device. The use of multiple electrical driving forces to control the flow through complicated networks of intersecting channels in a microfluidic device is described in U.S. Pat. No. 6,010,607, which is incorporated herein by reference in its entirety. The use of multiple pressure driving forces to control flow through complicated networks of intersecting channels in a microfluidic device is described in U.S. Pat. No. 6,915,679, which is incorporated herein by reference in its entirety.

The use of multiple electrical or pressure driving forces to control flow in a chip provides extremely precise flow control. In many microfluidic devices, this precise flow control is employed to define an exact volume of a sample to be delivered to a capillary electrophoresis (CE) separation process. For example, in previously cited U.S. Pat. No. 6,010,607, electrical driving forces create a flow pattern that constrains a flow of sample material into a precisely defined volume. Alternatively, U.S. Pat. No. 6,423,198 describes a method in which a volume of sample material is defined by the distance along a channel between an inlet to the channel and an outlet from the channel.

The resolution and sensitivity of CE separation processes can be enhanced by concentrating the sample before the sample is subjected to the CE process. Concentrating a sample can be used to increase the concentration of sample components to more detectable levels. The field amplified sample stacking (FASS) process is one method of concentrating a sample before the sample is subject to a CE separation process. The combination of FASS and CE is discussed in Jung, B., Bharadwaj, R. and Santiago, J. G., "Thousand-fold signal increase using field-amplified sample stacking for on-chip electrophoresis," Electrophoresis, Vol. 24, pp. 3476-3483 2003, which is incorporated by reference in its entirety. Another process that can be used to concentrate a sample before CE is isotachophoresis (ITP). The combination of ITP and CE is discussed in U.S. Published Patent Application No. 2005/0133370, which is incorporated by reference in its entirety, and U.S. Pat. No. 6,818,113.

The primary motivation for concentrating a sample before it is subject to a separation process such as CE appears to be to make low-concentration components of the sample easier to detect. It does not appear to be recognized, however, that concentration-changing processes could also be employed to manipulate the concentrations of reacting chemicals within a microfluidic device. Since the rates of chemical reactions are typically determined by the concentration of one or more reactants, being able to manipulate the concentration of the rate-limiting reactant(s) could lead to precise control of reaction rates within a microfluidic device.

It is thus an object of the present invention to manipulate the concentration of one or more reactants within a microfluidic device.

It is a further object of the present invention to couple the ability to control reactant concentration with other known methods of increasing the rate of chemical reactions within a microfluidic device.

These and further objects will be more readily appreciated when considering the following disclosure and appended claims.

SUMMARY OF THE INVENTION

A method of carrying out a chemical reaction on a microfluidic device in which a first reactant at a first concentration is delivered into a reaction channel; within the reaction channel the concentration of the first reactant is changed from the first concentration to a second concentration; and while at the second concentration the first reactant is exposed to a second reactant.

DETAILED DESCRIPTION OF THE INVENTION

Embodiments of the present method are directed to methods of manipulating the concentration of reactants in a microfluidic device. More particularly, embodiments of the invention provide methods of increasing the concentration of reactants, which in general will speed up the rate of a chemical reaction. In some methods in accordance with the invention, reaction and concentration of reagents occurs simultaneously and therefore leads to improved reaction conversion for a given analysis time. Introducing a mixing step while the reaction takes place can lead to even higher rates of reaction.

One way to increase reaction conversion within a microfluidic device is to simply increase the time the reagents are in contact. This however, increases the total analysis time of chemical/biochemical assays and can be undesirable for most microfluidic systems. Increasing concentration of reactants increases reaction conversion without increasing analysis time. For example, in the following reaction, doubling the concentrations of A and B increases the rate of production of C by four-fold:

$$A+B \rightarrow C$$

$$\frac{dC_c}{dt} = k_f C_A C_B$$

In methods in accordance with the invention, sample stacking processes increase the concentration of reagents at the same time the reagents are reacting. A variety of sample stacking techniques, including isotachophoresis (ITP) and field amplified sample stacking (FASS) are compatible with embodiments of the invention. Concentration enhancements in excess of 1000-fold are possible using sample stacking techniques. Such high concentration enhancement can significantly improve reaction conversion.

Figure 1A:
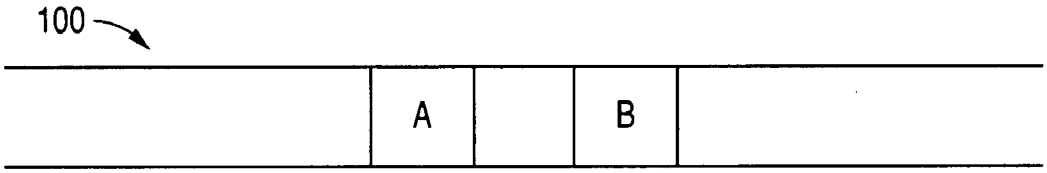
FIGS. 1A-1D show an embodiment of the invention in which the reactants are introduced in separate boluses.
Figure 1B:
Figure 1C:
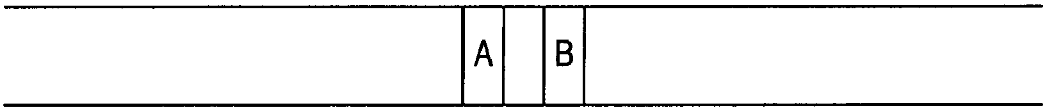
Figure 1D:
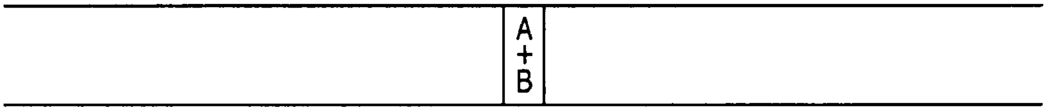

FIGS. 1A-1D schematically show an embodiment of the invention in which each of reactants A and B is introduced into a microfluidic channel 100 in a separate bolus. Methods of introducing materials in distinct boluses into a microfluidic channel are well known in the art. See, e.g., U.S. Pat. No. 5,942,443, which is incorporated herein by reference in its entirety. Although FIG. 1A indicates that the boluses of A and B are not in direct contact, the boluses may or not be in direct contact in various embodiments of the invention. In the embodiment of FIGS. 1A-1D, the two boluses are subjected to a stacking process. Details of a number of stacking processes in accordance with the invention will be discussed in more detail below. As shown schematically in FIG. 1B, the stacking process reduces the volume occupied by the reactants, thus increasing their concentration. The concentrated reactants can then be brought into contact with each other as indicated in FIGS. 1C and 1D so that the reaction between A and B can take place. The concentrated boluses of A and B can be brought into contact using the so-called "band-crossing" or "electrophoretically mediated micro-analysis (EMMA)" method. This method is described in detail in a variety of references, including J. Jianmin Bao, and F. E. Fred E. Regnier, "Ultramicro enzyme assays in a capillary electrophoretic system," J. Chromatogr., vol. 608, pp. 217-224, 1992; B. J. Bryan, J. Harmon, D. H. Dale, H. Patterson, and F. E. Fred E. Regnier, "Mathematical treatment of electrophoretically mediated microanalysis," Anal. Chem., vol. 65, pp. 2655-2662, 1993; C. H. Chen, J. C. Mikkelsen, and J. G. Santiago, "Electrophoretic band crossing for measurements of biomolecular binding kinetics" presented at the 2000 International Forum on Biochip Technologies, Beijing, China; A. Matta, O. M. Knio, R. G. Ghanem, C. H. Chen, J. G. Santiago, B. Debusschere, and H. N. Najm, "Computational study of band-crossing reactions, " J. MEMS, vol. 13, pp. 310-322, 2004; and U.S. Pat. No. 5,810,985. In the band-crossing method, the boluses of reactants are arranged so that they move toward each other and cross when they are subjected to a capillary electrophoresis process. Thus one method of implementing the embodiment shown in FIGS. 1A-1D is to stack the boluses using a stacking process, and then subsequently subject the boluses to a capillary electrophoresis process. Methods of subjecting stacked boluses are known in the art. See, e.g., U.S. Published Application No. 2005/0133370 and U.S. Pat. No. 6,818,113. An alternative method of implementing the embodiment of FIGS. 1A-1D is to arrange the boluses so that they move toward and cross each other during the stacking process. One skilled in the art could accomplish that arrangement by identifying the material property by which the stacking method segregates materials, and then placing the boluses of material in the channel so the materials pass each other during the segregation process.

In the embodiment shown in FIGS. 1A-1D, the "mixing time" is also the reaction time. In the traditional band-crossing method, the mixing time, $t_m$, is given by:

$$t_m \sim L/E(v_1 - v_2)$$

where L is the "band" or the "plug" length, E is the electric field, and $v_1 - v_2$, refers to the relative mobility between the two ionic reagents. Unlike tube-based immunoreactions, microchip-based reactions are coupled to electrophoretic mixing step. Therefore, optimization and control of reaction conversion is complex and requires good estimates of the reaction rates. The interplay between the reaction kinetics and mixing time can described by following electrophoretic Damkholer number:

$$Da = t_{rxn}/t_m.$$

In the above relation, $t_{rxn}$ is the reaction time scale which depends on the reactant concentration, kinetic coefficients, and the order of the reactions (e.g., first order, second order etc.).

Figure 2A:
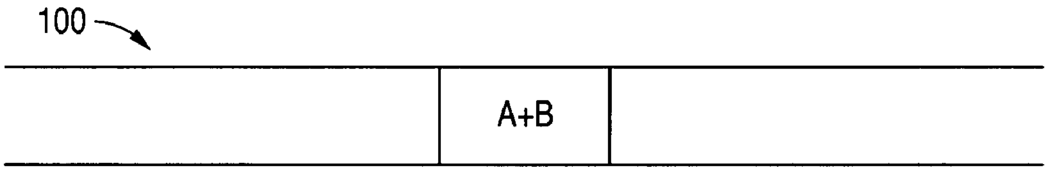
FIGS. 2A-2B show an embodiment of the invention in which the reactants are introduced in a single bolus.
Figure 2B:
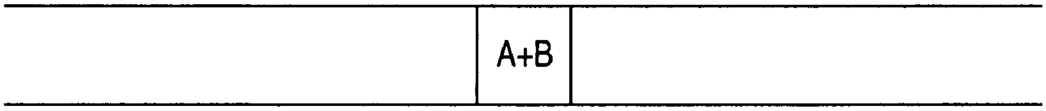

An alternative embodiment of the invention is shown in FIGS. 2A and 2B. In this embodiment, the reactants are before or while they are introduced into microfluidic channel 100. The combined bolus containing A and B is subjected to a stacking process within the microfluidic channel, which reduces the volume of the bolus as shown in FIG. 2B. The volume reduction of the bolus increases the concentration of both A and B.

Figure 3:
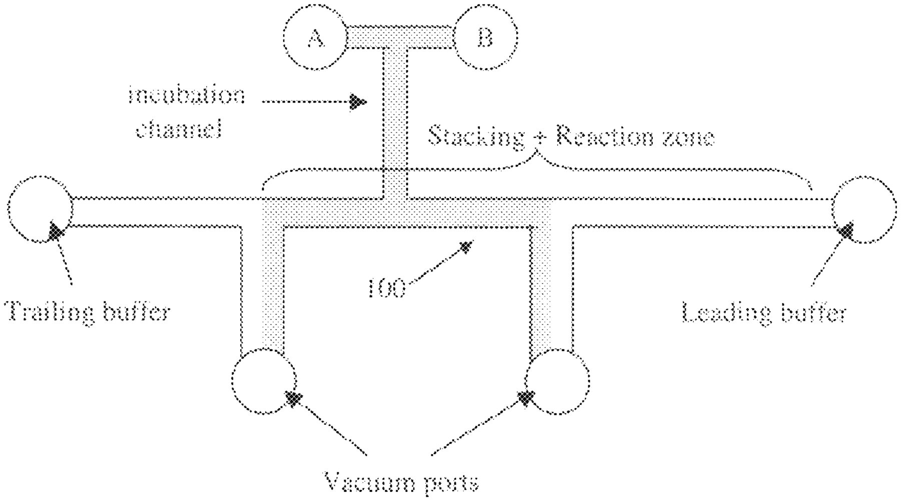
FIG. 3 is the channel layout in a microfluidic device in which stacking occurs via ITP.

The channel layout of a microfluidic device in accordance with the embodiment of FIGS. 2A and 2B is shown in FIG. 3. In the embodiment of FIG. 3, reactants A and B are drawn from their respective reservoirs through the incubation channel and into the main channel 100 through the application of a reduced pressure to the vacuum ports. The reactants mix starting when they meet in the incubation channel. It may be desirable have a short incubation channel to minimize the time spent while the reagents are unstacked. The stacking process takes place in the main channel 100. The device shown in FIG. 3 is configured to perform ITP stacking since the combined bolus of A and B in the main channel 100 is between a trailing buffer and a leading buffer. The reaction will take place as the bolus is stacked as it moves toward the leading buffer reservoir.

Figure 4:
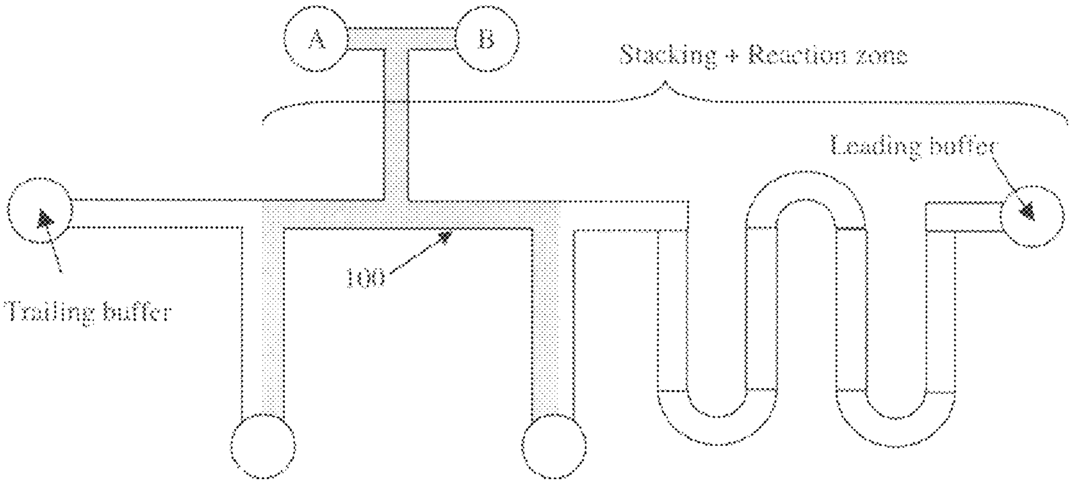
FIG. 4 is the channel layout in a second microfluidic device in which stacking occurs via ITP.

Methods in accordance with the invention may also employ known mixing methods to further enhance the reaction between A and B. For example, as shown in FIG. 4, the microfluidic device may include bends and ridges in the main channel 100 to promote mixing. Bends can cause significant dispersive mixing during electrophoretic transport of analytes. See Molho, J. I., Herr, A E; Mosier, B P; Santiago, J G; Kenny, T W; Brennen, R A; Gordon, G B; Mohammadi, B, "Optimization of turn geometries for microchip electrophoresis," Anal. Chem., vol. 73, pp. 1350-1360, 2001. As in FIG. 3, the embodiment in FIG. 4 is configured for ITP stacking, so the reaction will take place as the bolus is stacked as it moves toward the leading buffer reservoir. As it moves toward that reservoir, mixing within the bolus will be enhanced by the bends in the main channel 100. Other methods of enhancing mixing are also compatible with the invention. For example, a pressure-driven flow can be superimposed over the ITP flow in the device shown in FIGS. 3 and 4. The pressure-driven flow will enhance mixing as a result of the well-known Taylor dispersion mechanism. See Taylor, G. I., Proceedings of the Royal Society of London. Series A, v. 219, p. 186, 1953. Pressure driven flow can be directed either towards or against the direction of motion caused by the stacking process.

In the embodiments of FIGS. 3 and 4, the amount of mixing that takes place in the incubation channel can be tuned by controlling the loading pressure, which determines the amount of time the time the reactants are exposed to each other in the incubation channel. By controlling the current in the main channel 100, the degree of reaction may be controlled in context of the mixing achieved by the mixer. The combination of those two degrees of freedom allows users to use one chip design to achieve various degrees of mixing and reaction conversion.

Imposing a pressure-induced flow during an ITP stacking process that opposes the ITP-induced flow provides the potential advantage in that a short channel length may be used to produce a long contact time between the reactants at controlled concentrations. As previously discussed, the use of current and pressure simultaneously will also produce additional mixing.

A variety of different stacking processes are compatible with the practice of the invention. Four exemplary stacking methods will be set forth: field amplified sample stacking, isotachophoresis, isoelectric focusing, and temperature gradient focusing.

Figure 5:
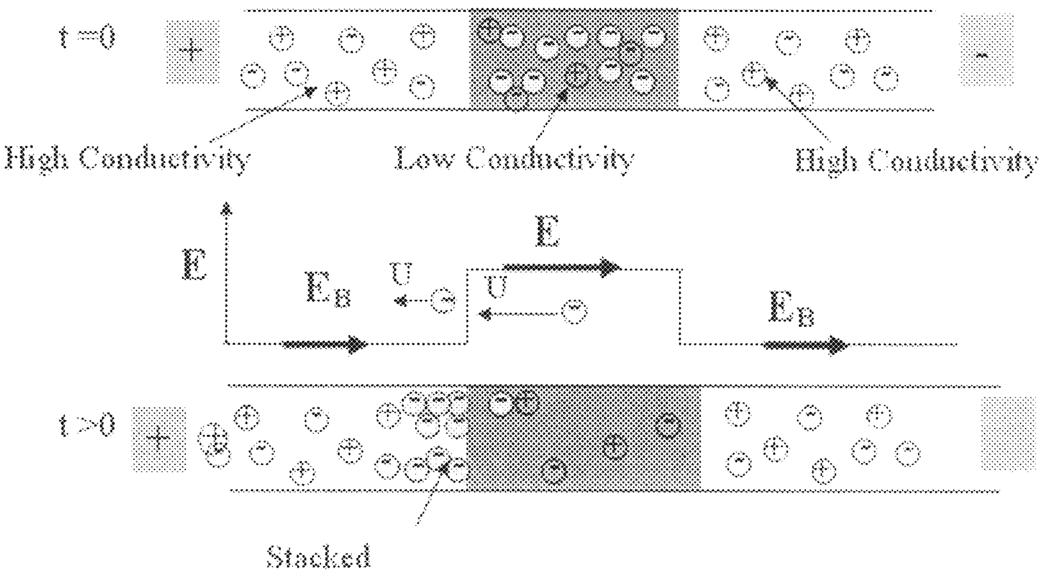
FIG. 5 is a schematic representation of the field amplified sample stacking process.

Field amplified sample stacking (FASS) is a sample concentration technique that leverages conductivity gradients between a sample solution and background buffer as shown in FIG. 5. Sample ions are dissolved in a relatively low conductivity electrolyte which has a high electrical resistance in series with the rest of the flow. This high resistance results in large electric fields within the sample and, therefore, large local electrophoretic velocities. Sample ions stack as they move from high field, high velocity region to the low field, low velocity regions.

Figure 6:
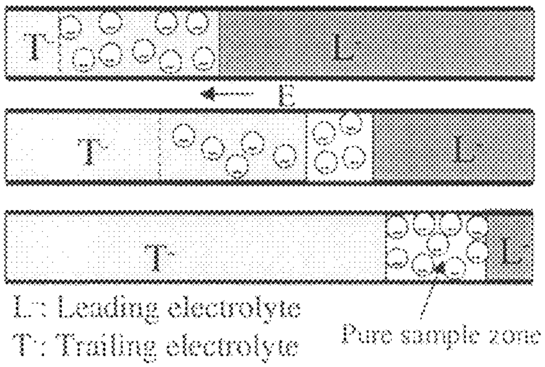
FIG. 6 is a schematic representation of the isotachophoresis stacking process.

FIG. 6 shows a schematic representation of the ITP process. The ITP process involves two buffer systems called 'leading' and 'terminating (or trailing)' electrolytes. The leading electrolyte (LE) is chosen to have a faster mobility than the sample ions, while the terminating electrolyte (TE) has a slower mobility than the sample ions. A common counterion maintains electroneutrality and helps maintain a constant and uniform pH. When an electric field is applied to such a system, sample ions (which can originally be mixed with either or both the TE or LE) become progressively segregated into a region sandwiched by the leading and terminating ions. This process eventually leads to formation of a zone comprised solely of the sample ions which is bounded by zones of leading and terminating electrolyte ions. At long times, a quasi-steady condition is achieved in which the three ions, LE, sample, and TE, order themselves according to their respective mobilities and all the zones move through the channel at a constant speed. The constant velocity is given by:

$$U=v_L E_L F=v_S E_S F=v_T E_T F$$

where, $v_T$, is the terminating ion mobility, $v_L$, is the leading ion mobility, $v_S$, is the sample ion mobility, E, is the electric field, and F is the Faraday's constant. In recognition of this constant migration velocity of the three zones, the technique is called isotachophoresis: iso meaning same and tacho meaning speed. The final concentration of the sample ions can be analytically calculated using the Kohlrausch regulating function and the conservation of current:

$$C_{S,final}=C_L\left(\frac{v_A+v_L}{v_A+v_S}\right)\frac{v_S}{v_L}$$

where, $C_{s,final}$ is the final sample ion concentration, $C_L$, is the leading ion concentration distribution, $v_A$, is the counterion mobility.

The fundamental premise of isoelectric focusing (IEF) is that a molecule will migrate in an electric field as long as the molecule is charged. When the molecule becomes neutral, it will not migrate. When IEF is implemented in a microfluidic channel, a pH gradient is established along the length of the channel so that the pH is lower near the anode and higher near the cathode. The pH gradient is generated using a series of zwitterionic compounds known and carrier ampholytes. When an electric field is applied along the length of the channel, ampholytes that are positively charged will migrate towards the cathode while the negatively charged ampholytes migrate toward the anode. This creates a pH gradient along the length of the channel, with the lower pH being near the anode. When a sample molecule is introduced into the channel, it will migrate until it reaches a point where its net charge becomes zero. That point is determined by the molecules isoelectric point pI. Thus IEF segregates molecules according to the respective pI of each molecule.

Temperature gradient focusing (TGF) uses the fact that the electrophoretic velocity of a sample molecule is a function of the temperature and that a sample molecule will be focused at a point where its electrophoretic velocity is equilibrated with the bulk fluid velocity along a microfluidic channel with a temperature gradient.

EXAMPLE

Application to AFP Assay

Despite mixed opinions of its usefulness, α-fetoprotein (AFP) remains the most useful tumor marker for screening patients for hepatocellular carcinoma (HCC) today. Commonly, HCC patients have AFP concentrations of 20 ng/mL or more in their blood serum. Furthermore, patients with AFP levels of greater than 400 ng/mL have a lower median survival rate. There are three glycoforms of AFP: AFP-L1, AFP-L2, and AFP-L3. The three forms differ in their ability to bind to lectin lens culinaris agglutin (LCA). Relative fractions of the AFP glycoforms may provide additional information serverity and prognosis of HCC. A relatively high percentage of AFP-L3 has been associated with biological malignancy and poor differentiation in clinical studies. Furthermore, it has been found that patients with positive AFP-L3 have poorer liver function and tumor histology.

Among the many methods available for detecting AFP in serum, the most commonly used methods include Enzyme-Linked Immunosorbent Assay (ELISA) and chemiluminescence. Even though those techniques are sensitive enough to screen patients for HCC, both methods are labor intensive and time consuming. Methods in accordance with the invention can perform immunoassays in a microfluidic device that integrates many of the labor intensive procedures into an automated system.

Figure 7A:
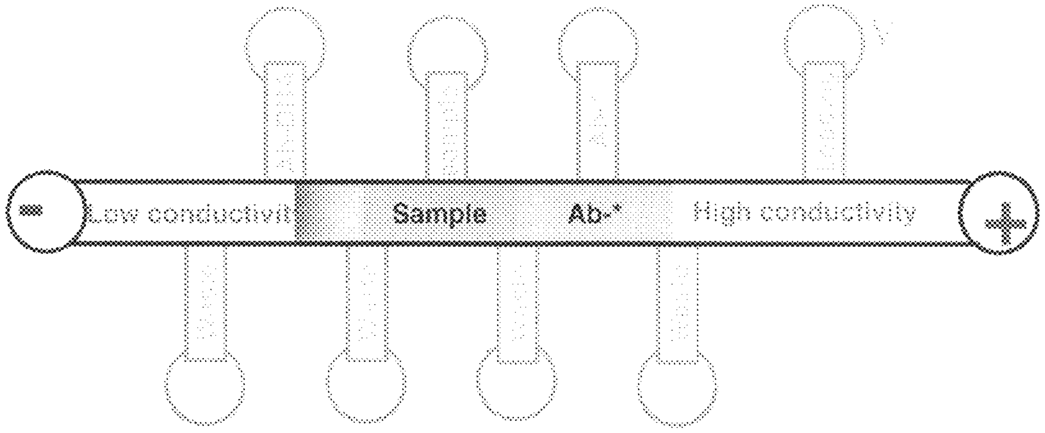
FIGS. 7A-7F illustrates an embodiment of the invention employing ITP stacking.

FIGS. 7A-7F schematically show how ITP can be used in conjunction with reactions to enhance reaction rates and also improve detection sensitivity at the same time. FIG. 7A shows the loading protocol of the reagents in the microchip. Vacuum is applied at the four waste wells to enable loading of the respective reagents from the various reagent wells. The leading buffer composition is 75 mM Tric-Cl with 50 mM NaCl. The leading ion for ITP was chloride and the pH is around 8.0. The trailing buffer is Tris (75 mM)-HEPES (125 mM). The trailing ion for ITP is HEPES and the pH is around 7.5. Typically, the leading electrolyte has higher conductivity than the trailing electrolyte and this mis-match in conductivity is used to switch from the ITP mode to CE separation mode by the voltage "hand-off" mechanism.

The sample can be any antigen of interest present in a serum sample. In this example the sample is alpha-fetoprotein (AFP). The sample is analyzed using the sandwich assay described in U.S. Published Patent Application No. US2004/0144649, which is incorporated by reference in its entirety. The two antibodies required for the sandwich immunoassay are depicted as "Ab-DNA" and "Ab-*". The Ab-DNA antibody is a DNA labeled antibody. The role of DNA is to tailor the charge and mobility of the first antibody. The second antibody is labeled with a fluorescent molecule to enable fluorescence based detection. The order of arrangement of the Ab-DNA, Sample, followed by Ab-* is crucial for on-chip mixing caused by the so-called "band crossing" or EMMA (electrophoresis mediated microanalysis) method. The following reaction steps take place:

Reaction 1: AFP+Ab-DNA⟵⟶AFP–Ab-DNA
Reaction 2: AFP+Ab-*⟵⟶AFP–Ab-*
Reaction 3: AFP–Ab-DNA+Ab-*⟵⟶Al-AFP–Ab-*
Reaction 4: AFP–Ab-*+Ab-DNA⟵⟶Ab-DNA-AFP–Ab-*

Figure 7B:
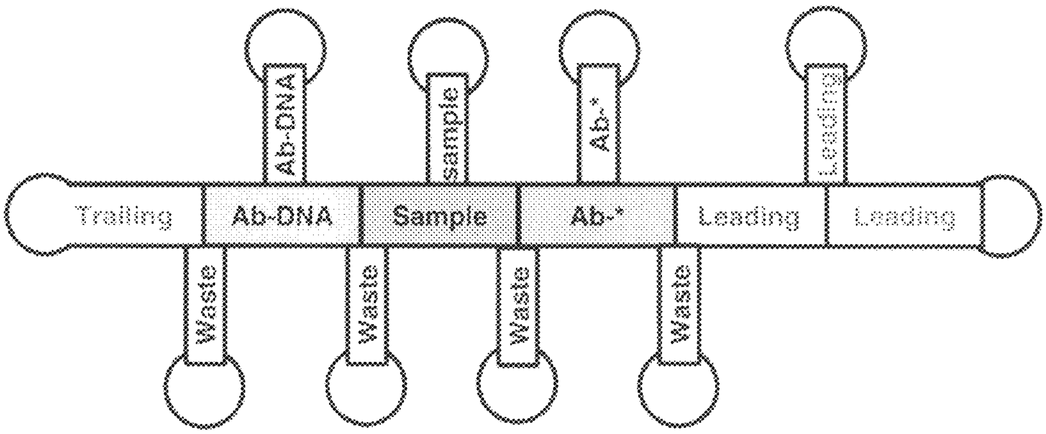
Figure 8:
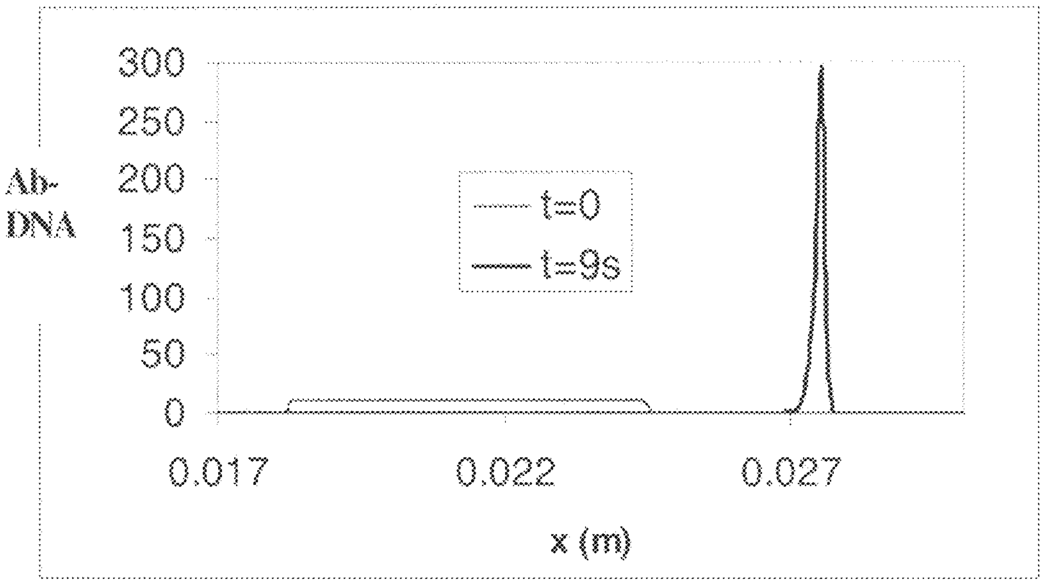
FIG. 8 shows the result of a simulation of the embodiment of FIGS. 7A-7F.

FIG. 7B: shows the initiation of stacking of Ab-DNA reactant upon application of electric field. Simulations show that the amount of stacking for the buffer composition and chip dimensions is around 30-fold (FIG. 8). The length of Ab-DNA zone was around 6 mm, the sample zone was 14 mm long, and Ab-* zone was around 20 mm long.

Figure 7C:
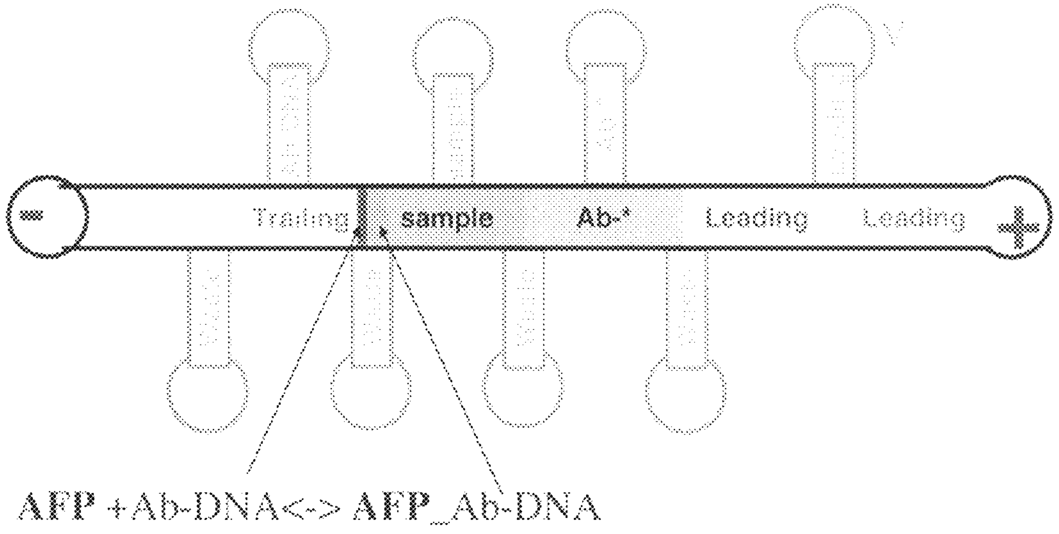

FIG. 7C shows that when "stacked" reactant Ab-DNA enters the sample region, reaction 1 gets started. Also, note that product AFP-Ab-DNA also stacks and gets concentrated.

Figure 7D:
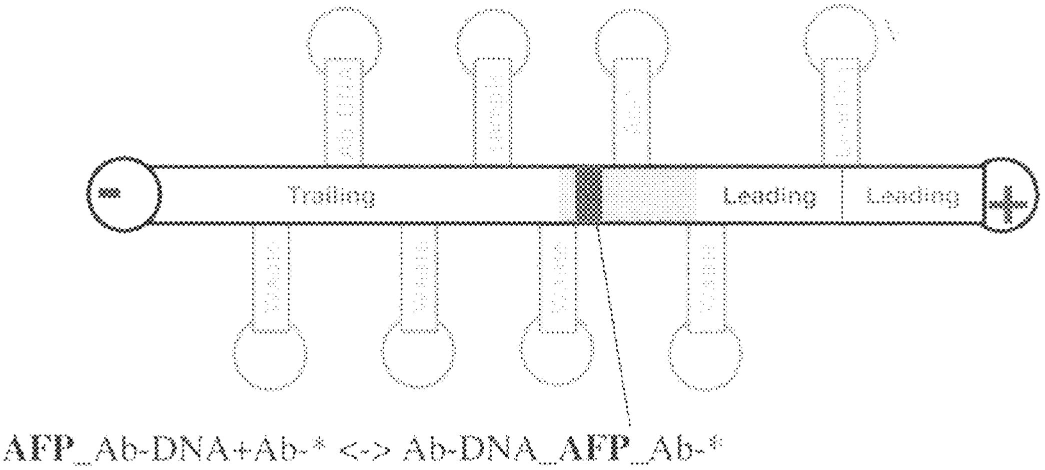

FIG. 7D shows that when the reactants Ab-DNA, AFP, and AFP-Ab-DNA enter the Ab-* reactant zone, above mentioned reactions 2-4 take place. Finally, the immunocomplex of interest, Ab-DNA-AFP- Ab-*, is generated and also stacked by ITP mode to enable high sensitivity detection.

Figure 7E:
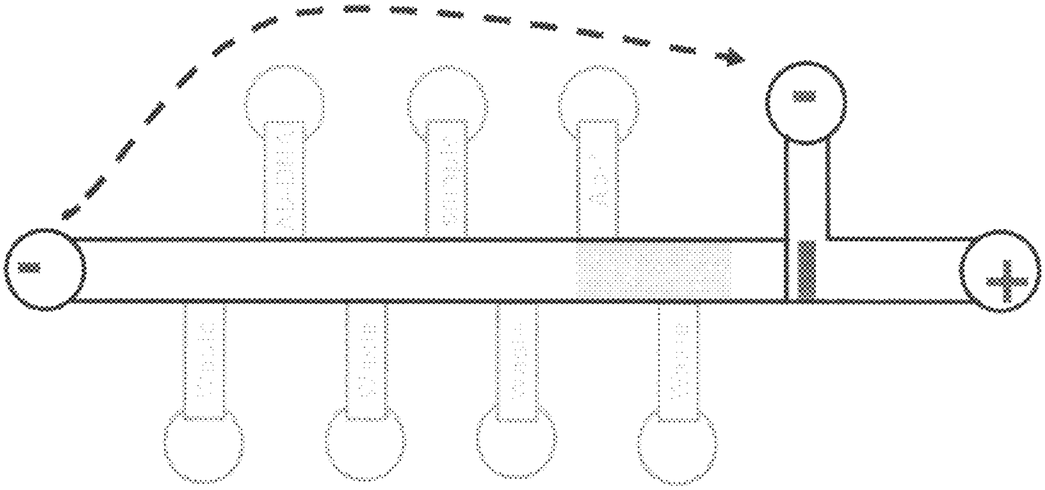
Figure 7F:
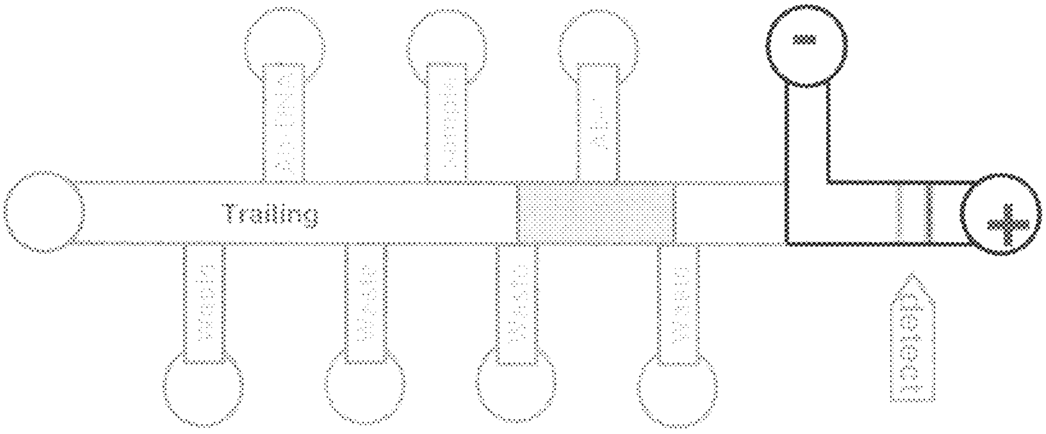

FIGS. 7E and 7F show how voltage at the hand-off well can be used to break the ITP-reaction mode and enable the separation and detection step in the assay. The separation length in this case was around 20 mm.

Figure 9:
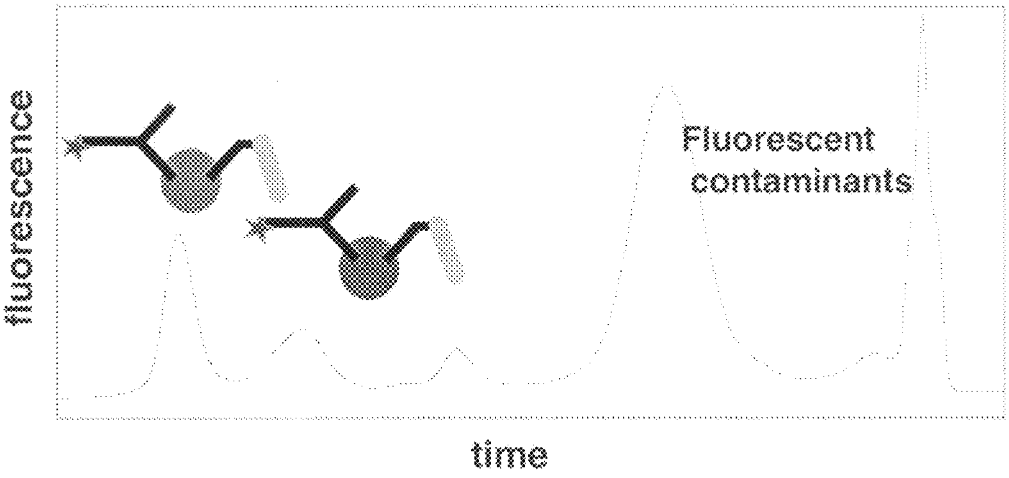
FIG. 9 is an electropherogram produced by the embodiment of FIGS. 7A-7F.

FIG. 9 shows an actual electrophoregram generated using the protocol and chip.

Example: Application to Parallel Assays

Figure 10:
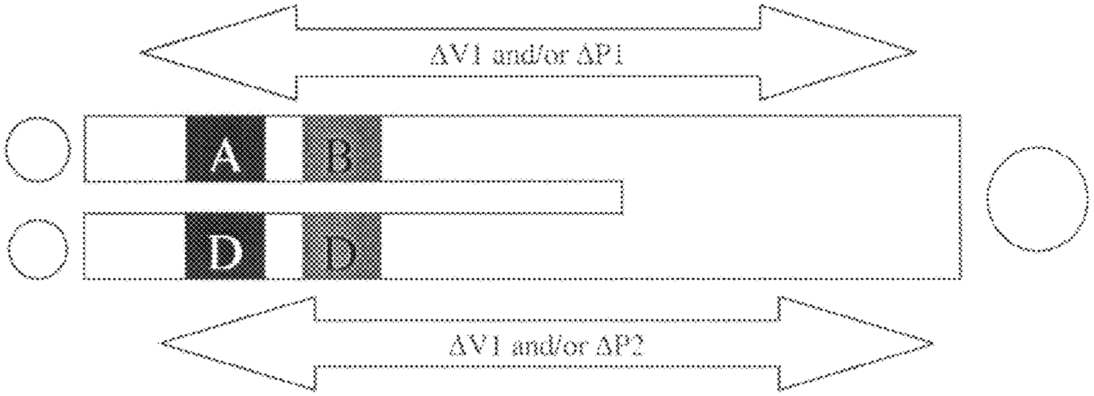
FIG. 10 is an embodiment of the invention employing parallel channels.

Embodiments of the invention may involve parallel channels that precondition the concentration and purity of the reactants prior to mixing and reaction. Reactions that require multiple sequences of reaction steps may employ these parallel channels in sequence to achieve the desired outcome. The purified reactants may be introduced in sequence to isolate only the desired reaction/product by the use of time dependent script or channel geometry that promote segregation and mixing of desired components. An example of an embodiment employing parallel channels is shown in FIG. 10. In that embodiment the microfluidic device is capable of carrying the following two reactions in parallel in the two channels on the left side of the figure:

$$A+B\rightarrow C$$

$$D+E\rightarrow F$$

The products of those two reactions are combined in the single channel on the right side of the figure. Within that single channel the products of the first reactions subsequently undergo a third reaction:

$$C+F\rightarrow G$$

Example: Use of ITP to Measure Reaction Kinetics

The reverse kinetics of a reaction between A and B to produce C can be measured by introducing the reactants and product into the ITP channel at concentrations that correspond to a steady-state equilibrium between the reactants and product. The equilibrium mix may be generated by either pressure mixing in or a steady state ITP stack. As the product is formed from it reacts or dissociates into its components. The changing signal of the reagents or products may then be used to estimate the reaction kinetics of the reaction.

The invention can be embodied in other specific forms without departing from the spirit or essential characteristics thereof. The present embodiments, therefore, are to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of modifying the concentration of reactants and carrying out a chemical reaction on a microfluidic device, the method comprising:
- delivering a first reactant into a reaction channel;
- subjecting the first reactant to a stacking process, thereby producing a first stacked reactant;
- exposing the first stacked reactant to a second reactant that is not stacked so that the first stacked reactant and the second reactant undergo a chemical reaction, thereby producing a first product; and
- subjecting the first product to the stacking process, thereby producing a first stacked product.

2. The method of claim 1, wherein the steps of subjecting the first reactant and the first product to the stacking process comprise subjecting the first reactant and the first product to isotachophoresis.

3. The method of claim 1, wherein the steps of subjecting the first reactant and the first product to the stacking process comprise subjecting the first reactant and the first product to field amplified stacking.

4. The method of claim 1, wherein the steps of subjecting the first reactant and the first product to the stacking process comprise subjecting the first reactant and the first product to isoelectric focusing.

5. The method of claim 1, wherein the steps of subjecting the first reactant and the first product to the stacking process comprise subjecting the first reactant and the first product to temperature gradient focusing, viscosity gradient focusing, or pH induced focusing.

6. The method of claim 1, wherein exposing the first stacked reactant to the second reactant so that the first stacked reactant and the second reactant undergo a chemical reaction comprises subjecting the first stacked reactant and the second reactants to an electrophoretically mediated micro-analysis method.

7. The method of claim 1, further comprising:

exposing the first stacked product to a third reactant that is not stacked so that the first stacked product and the third reactant undergo a chemical reaction, thereby producing a second product; and subjecting the second product to the stacking process, thereby producing a second stacked product.

8. The method of claim 1, wherein exposing the first stacked reactant to the second reactant so that the first stacked reactant and the second reactant undergo a chemical reaction comprises subjecting the first stacked reactant and the second reactants to a capillary electrophoresis process.

9. The method of claim 8, wherein exposing the first stacked reactant to the second reactant so that the first stacked reactant and the second reactant undergo a chemical reaction comprises subjecting the first stacked reactant and the second stacked reactants to a band-crossing method.

10. The method of claim 8, wherein exposing the first stacked reactant to the second reactant so that the first stacked reactant and the second reactant undergo a chemical reaction comprises mixing the first stacked reactant and the second reactants in the reaction channel to enhance the reaction between the first stacked reactant and second reactants.

11. The method of claim 10, wherein the microfluidic device includes one or more of bends and a ridge to promote mixing.

12. The method of claim 10, wherein the mixing is tuned by controlling a loading pressure and a current in the reaction channel.

13. The method of claim 12, wherein tuning the mixing controls a degree of the chemical reaction.

14. The method of claim 10, further comprising:

subjecting the first stacked reactant and the second reactant to a pressure-driven flow to promote mixing.

15. The method of claim 14, wherein the pressure-driven flow is directed toward a direction of motion caused by the isotachophoresis.

16. The method of claim 14, wherein the pressure-driven flow is directed against a direction of motion caused by the isotachophoresis.

* * * * *